ACCESSORY FOR TELEPHONE ANSWERING SYSTEM

Filed Nov. 3, 1965 3 Sheets-Sheet 1

INVENTOR

James R. Owen

BY

ATTORNEY

Oct. 7, 1969 J. R. OWEN 3,471,643

ACCESSORY FOR TELEPHONE ANSWERING SYSTEM

Filed Nov. 3, 1965 3 Sheets-Sheet 2

INVENTOR

James R. Owen

BY Gil C. Clegg

ATTORNEY

Oct. 7, 1969 J. R. OWEN 3,471,643

ACCESSORY FOR TELEPHONE ANSWERING SYSTEM

Filed Nov. 3, 1965

3 Sheets-Sheet 3

INVENTOR

James R. Owen

BY [signature]

ATTORNEY

United States Patent Office 3,471,643 Patented Oct. 7, 1969

3,471,643
ACCESSORY FOR TELEPHONE ANSWERING SYSTEM

James R. Owen, Costa Mesa, Calif., assignor to Phonemaster, Inc., Dallas, Tex., a corporation of Texas Filed Nov. 3, 1965, Ser. No. 506,247
Int. Cl. H04m *1/00*
U.S. Cl. 179—1 8 Claims

ABSTRACT OF THE DISCLOSURE

A telephone answering device having a case shaped to fit over the cradle of the telephone and formed to define a cradle for supporting the handset. The device includes first and second members pivotally mounted at one end to a supporting member and springs for biasing the first member downward to engage the hookswitch buttons of the telephone and biasing the second member upward. The spring associated with the second member is substantially stronger than the spring associated with the first member. Also provided is a solenoid connected for pivoting the first member upward against the force of the spring to a raised position to release the hookswitch buttons and a pin operated by the handset for pivoting the second member downward against its spring to a depressed position. The second member includes an element engageable with the first member for pivoting the first member upward and out of engagement with the hookswitch buttons as the second member pivots upward upon the handset being removed from the cradle when a signal is not applied to the solenoid.

The present invention relates to accessories used with telephone answering equipment and more particularly to a device used with a telephone answering system for purposes of freeing the buttons on a telephone set to permit communication through the receiver associated with the set.

Various types of systems for automatically answering telephones have been devised in recent years. Most often, these systems are capable of sensing the presence of ringing of the telephone, answering the incoming call by playback of a recorded message, and thereafter recording a brief message from the caller. Such systems may be of either the type in which the answering system is connected into the line leading to a telephone set or they may be the type that is not electrically connected into the line but rather uses the receiver of the telephone for the purpose of receiving incoming calls and delivery of messages. The device of the present invention is used with the latter type of system.

The device of the present invention is especially adapted for use in a telephone answering system of the type disclosed in patent application Ser. No. 490,947 entitled Telephone Answering Device assigned to the assignee of the present invention. As such, it functions to release the buttons of a telephone set in response to a signal indicating ringing of the telephone. In accordance with the present invention, there is provided a case shaped to fit over and rest upon the cradle of a telephone set and formed to define a cradle for supporting a telephone receiver. Positioned within the case and mounted to the body thereof is a supporting member. A first member is pivotally mounted at one end to the supporting member, the other end of the first member being engageable with the buttons of a telephone set upon which the device is positioned. A second member that is pivotally mounted at one end to the supporting member is also provided. The second member is suitably positioned below the first member such that the first member is movable between raised and depressed positions about the point of pivotal connection to the supporting member without affecting the position of the second member, but movement of the second member from a depressed to a raised position will cause the first member to also be moved from the depressed to a raised position. For accomplishing this result, there is provided biasing means for biasing the first member to a depressed position in which the first member bears against the buttons of a telephone to maintain them in a depressed position. There is also provided biasing means connected to the second member for biasing the second member to a raised position. The second biasing means is preferably of greater strength than the first biasing means whereby in the absence of forces other than the biasing means operating upon the first and second members, both will be pivoted to the raised position. There is also provided an element that is responsive to the receiver being positioned on the cradle for pivoting the second member downward against the force of the second biasing means to a depressed position and means effective responsive to a signal indicating ringing of the telephone for pivoting the first member upward against the force of the first biasing means to a raised position in which the buttons of the telephone are released.

In accordance with the preferred embodiment of the invention, the case is shaped such that when the receiver of the telephone is positioned on the cradle. Both the mouthpiece and earpiece of the telephone will be in close proximity to the case. Positioned within the case there is a speaker and a suitable pickup, each being positioned such that when the telephone receiver is positioned on the cradle, the loud speaker will be facing the mouthpiece of the receiver and the pickup will be adjacent to the earpiece. Suitably, the portion of the case extending between the speaker and the mouthpiece is perforated to facilitate transmission of sound waves. Also, in accordance with the preferred embodiment of the invention there is provided first and second switching devices. The first switch includes an element engageable with the first member when the first member is in the raised position and the second switch includes a member engageable with the second member when the second member is in the engaged position. Actuation of the first switch is indicative of a condition in which the buttons of a telephone have been released and operation of the second switch is indicative of a condition in which the receiver has been lifted from the cradle of the telephone. It will be noted that due to the interaction between the first and second members, that any time the receiver is lifted from the telephone, the buttons of the telephone will automatically be released.

Many objects and advantages of the invention will become readily apparent to those skilled in the art as the following detailed description of a preferred embodiment of the same unfolds when taken in conjunction with the appended drawings wherein like reference numerals denote like parts and in which.

Figures 1, 2:
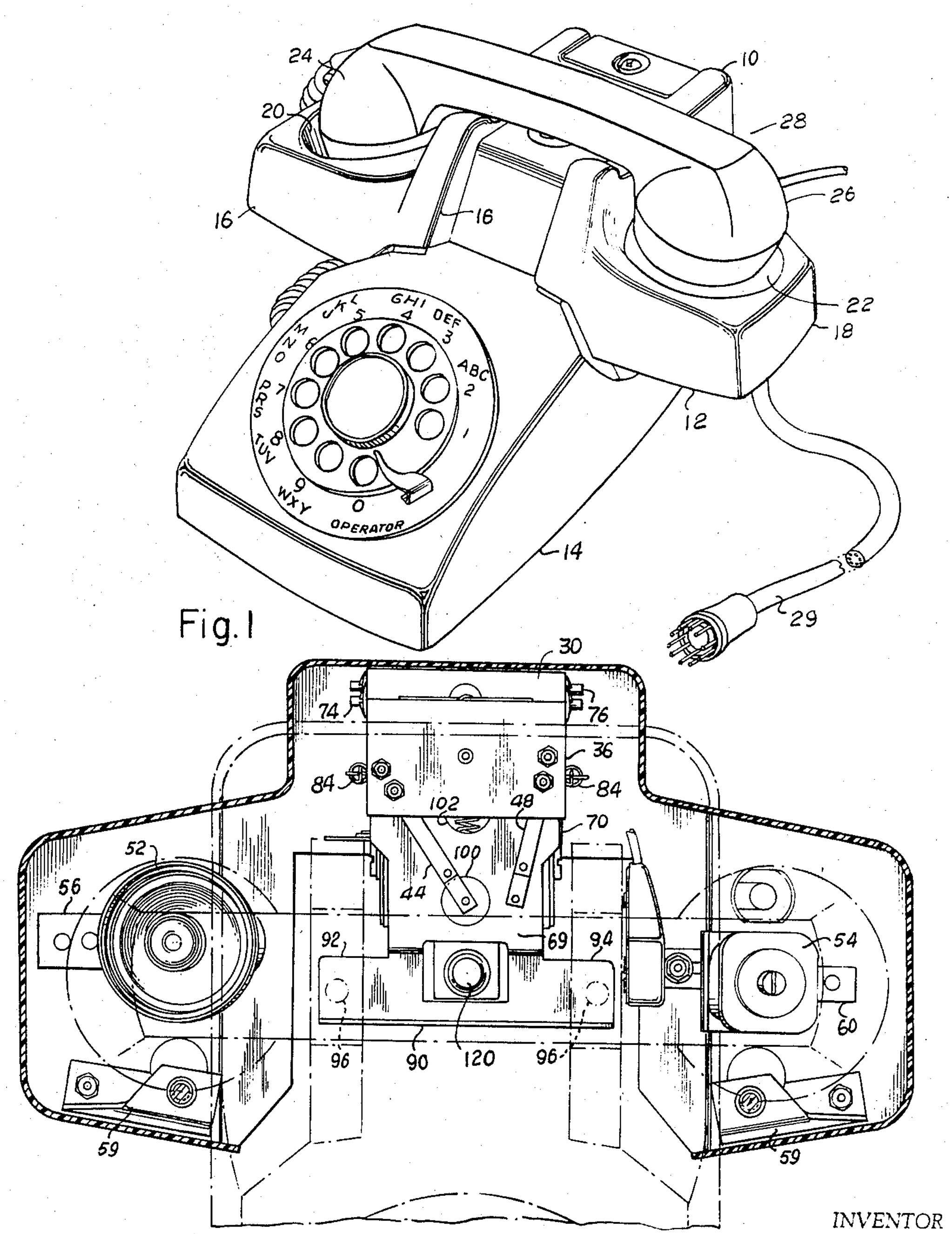
FIGURE 1 is a perspective view of the device of the present invention mounted on a conventional telephone set.
FIGURE 2 is a plan view of the device of the present invention with the case broken away to reveal the internal structural details.

Turning now to the drawings, the device of the present invention is designated generally by the reference numeral 10 that can be seen to include a case 12 that fits over a telephone set 14. Case 12 is shaped to define a cradle portion 16 which conforms to and fits over the cradle of the telephone 14, for positioning the device 10 on the telephone 14 and receiving the receiver 28. Case 12 is also shaped to define sidewardly extending portions 16 and 18 suitably having depressions 20 and 22, respectively, formed in the upper portion thereof for receiving the earpiece 24 and the mouthpiece 26, respectively, of receiver 28. The depressions 20 and 22 are desirable from the standpoint that they assist in positioning of the receiver 28, and also reduce feedback that may occur as a result of cross transmission between the earpiece and mouthpiece. Cable 29 is provided by electrically coupling the device 10 to the remainder of an answering device (not shown).

A supporting member 30 is positioned within the case 12 and mounted thereto by screws 32. The supporting member includes a forwardly extending channel portion 36 and a forwardly extending plate portion 38 positioned above the channel portion 36. Two switches 40 and 42 are connected to the under side of the forwardly extending portion 38. The pole 44 of switch 40 is directed inwardly toward the center of the device and attached to its end portion is a depending rod member 46. The pole 48 of switch 42 is also directed inwardly and terminates in depending tubular portion 50.

Also positioned within the case 12 is a speaker 52 and an inductive pickup coil 54. The speaker 52 is supported by bracket 56 positioned directly beneath the depression 20. The bracket 56 is supported by a bottom plate 57 that is connected to the case 12 by brackets 59 and to the supporting member 36 by screws 61. The base of the depression 20 is suitably perforated by holes 58 for permitting the passage of sound waves from the speaker 52 into the mouthpiece 24 of the receiver 28. Similarly, the inductive pickup coil 54 is supported by bracket 60 positioned underlying the depressed portion 22 such that coil 54 will be in close proximity to the coil (not shown) positioned within the earpiece 26. It is desirable that the two coils be as close as possible in order that the mutual coupling between the two will be large, thereby increasing the efficiency with which electrical signals representative of messages from a caller will be induced in the coil 54.

Figures 3, 4:
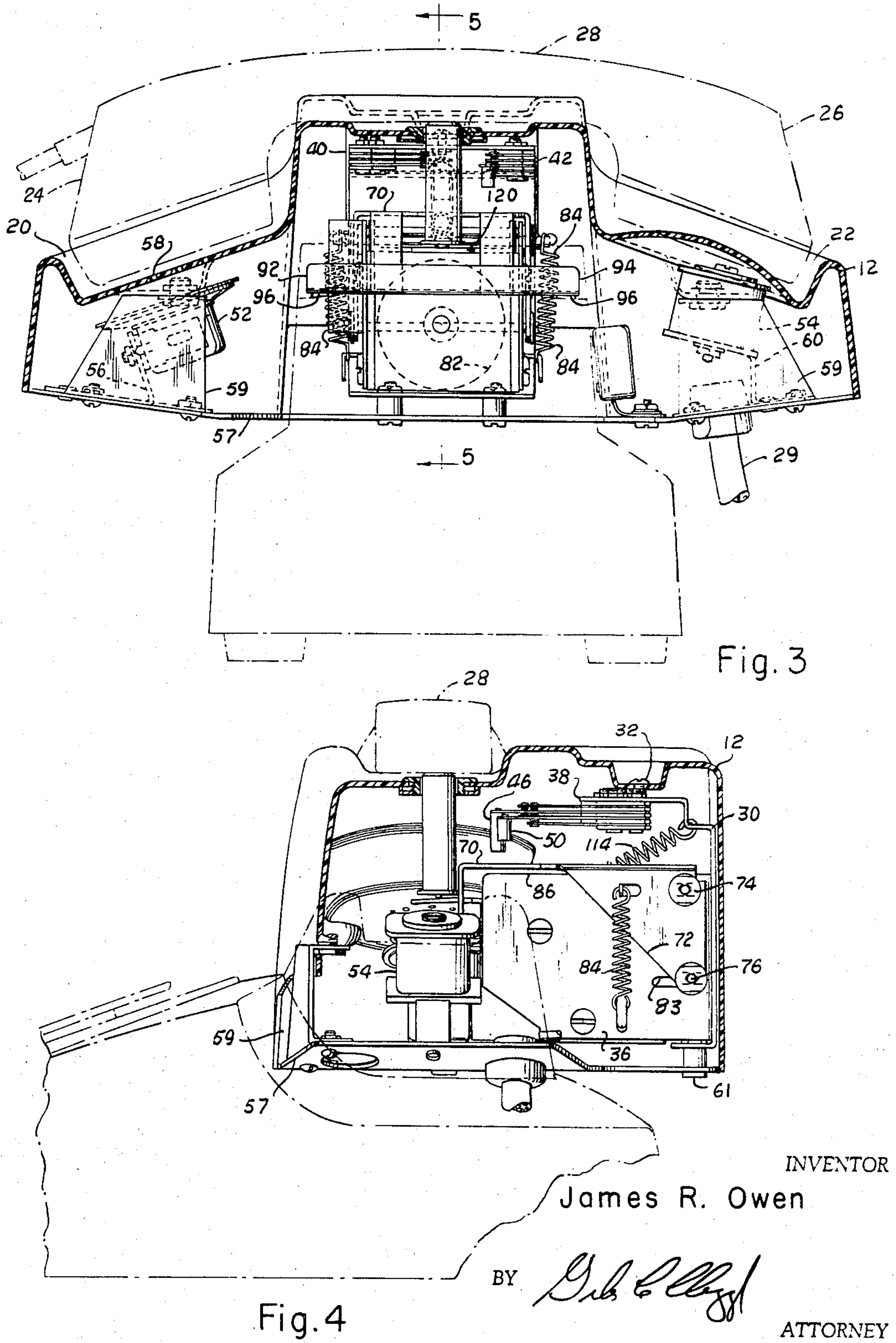
FIGURE 3 is a front elevation view of the device of the present invention with the case broken away.
FIGURE 4 is a side elevational view of the device of the present invention with the case broken away.

There is provided a first lever member 70 having a substantially flat main body portion 69 from which depend two downwardly extending ears 72. A pair of pins 74 and 76 pass through the ears 72. The uppermost pin 74 passes through the walls of the forwardly extending channel portion 36 of the support member 30 for pivotally connecting one end of the member 70 to the support member 30. It will be noted that the pin 74 passes through the ear portion 72 at a point very near the base of the ears. The pin 76, on the other hand, passes through the ear portions 72 at a point near the end. Pin 76 engages the armature 80 of solenoid 82 and is adapted for movement in slots 83 formed in the walls of the channel portion 36. Thus, when the solenoid 82 is energized, causing its armature 76 to move toward its coil, pin 76 will be moved to the left, as viewed in FIGURE 4, causing the member 70 to pivot about pin 74 in a clockwise direction.

It will be noted that a pair of springs 84 are connected to a channel portion 36 and the member 70 for biasing the member 70 downward or in a counter-clockwise direction, but that downward movement of the member 70 is limited by the upper edge portion 86 of the channel portion 36. As the member 70 is pivoted upward responsive to solenoid 82 being energized, tubular portion 50 depending from the armature 48 of the switch 42 will contact the body portion 69 of member 70, causing operation of the switch 42 in a manner to indicate that the buttons 96 on the telephone have been released. In this connection, it will be noted that member 70 is terminated in a downwardly extending portion 90 of substantially greater width than the body portion 69. The extra width of the downwardly extending portion 90 is occasioned by provision of ears 92 and 94 that extend across the two buttons 96 on the telephone. Thus, when solenoid 82 is not energized, springs 84 will bias the member 70 downward against the upper edge 86 of the supporting member 30. When member 70 is is in this position, the ears 92 and 94 of the downwardly extending portion 90 will engage the buttons 96 of the telephone, causing them to be depressed. However, when the solenoid is energized, the member 70 will be pivoted upward, releasing the buttons 96, also operating the switch 36 to a condition indicating release of the buttons. It will be noted that openings 100, 102 and 104 are formed in the member 70, for reasons to be explained as the description continues to unfold.

There is also provided a second member 110 that is pivotally mounted to the channel portion 36 by pin 112. Pin 112 is not visible in FIGURES 4 or 7 as it is positioned behind the ears 72 of the members 70, and can best be seen by reference to FIGURE 5. The member 110 is biased upward, or for rotation in a clockwise direction, by spring 114 that extends from the member 30 to the intermediate region of the member 110. It will be noted that spring 114 suitably passes through the opening 102 formed in the member 70. The end 116 of the member 110 extends through opening 104 formed in the member 70, but terminates short of the edge 118 of the hole 104.

Figures 5, 6:
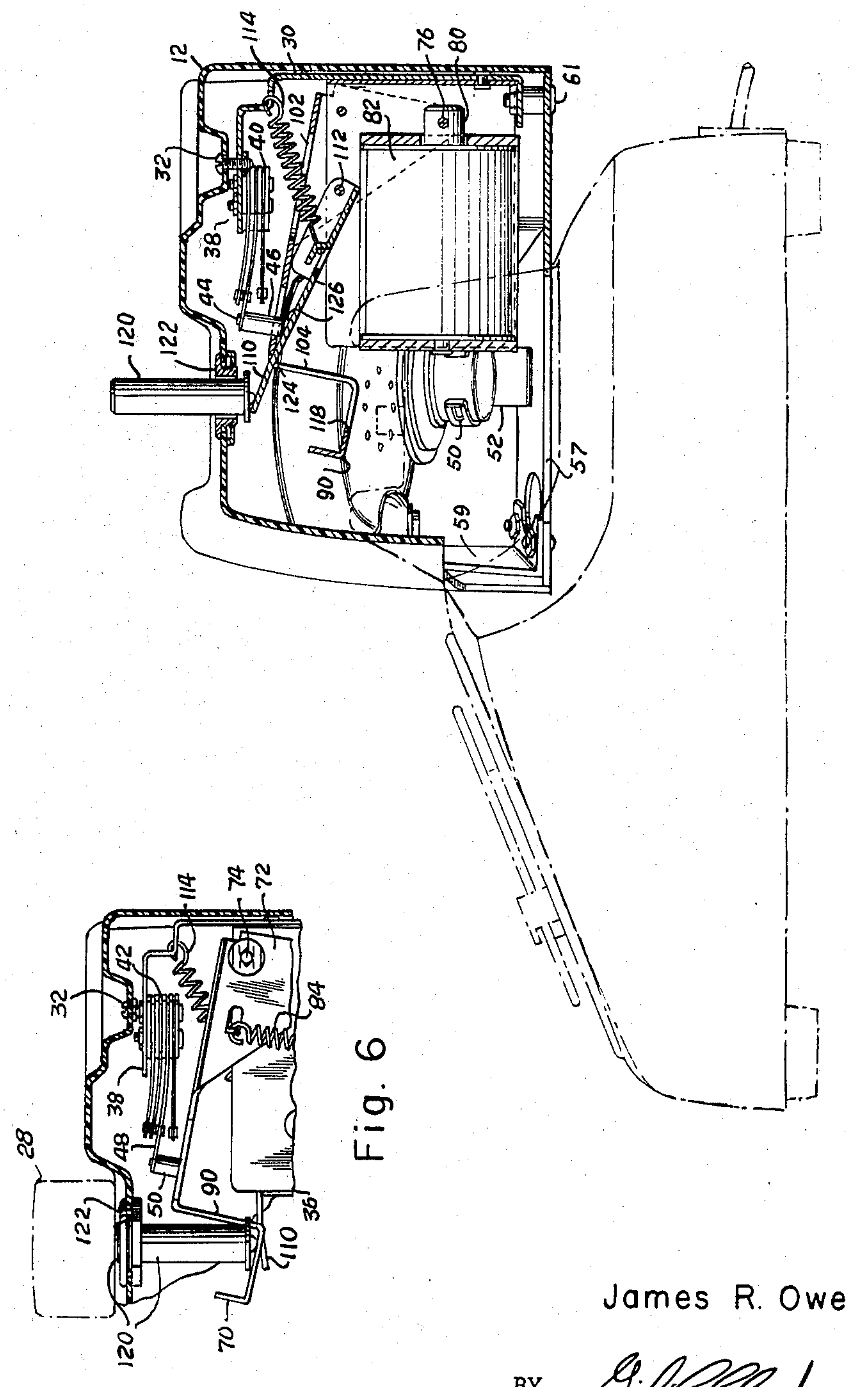
FIGURE 5 is a view taken along line 5—5 of FIGURE 3.
FIGURE 6 is a view similar to FIGURE 4 illustrating operation of the device when the buttons of a telephone are released without lifting of the receiver.

A vertically disposed rod member 120 passes through opening 122 formed in the central part of the case. When the receiver 28 is positioned on the cradle of the device, it will apply force through member 120 to depress the member 110 to a horizontally disposed position against the force of the spring 114. It will be noted that since the end 116 of member 110 terminates short of the edge 118 of the opening 104, it is possible for the member 70 to be pivoted to the raised position without disturbing the position of the member 110 or the receiver 28, as shown in FIGURE 6. Further, it will be noted that the tubular member 46 passes through the hole 100 such that switch 40 will not be effected by member 70 being pivoted to the raised position. On the other hand, if the receiver 28 is lifted from the cradle, spring 114 will bias the member 110 upward. In this connection, it will be noted that the force imposed by the spring 114 is substantially greater than the total force imposed by the springs 84, whereby when member 110 is pivoted upward, it will strike member 70 along the edge 124 of hole 104, pivoting member 70 to a raised position. As the member 70 is pivoted to the raised position, the portion 90 will be lifted out of engagement with buttons 96, effecting their release, and both of the switches 40 and 42 will be operated as the tubular portion 46 passes through the hole 100 to bear against the upper surface 126 of member 110 and the rod member 50 will bear against the surface 69 of member 70. Operation of the switches 40 and 42 will indicate both that the receiver 28 has been lifted from the cradle and that the buttons 96 of the telephone have been released.

The device of the present invention can be operated to release the buttons of the telephone either in response to an electrical signal being applied thereto or in response to the receiver 28 being lifted from the cradle defined by case 12 of the device. Extremely close coupling is provided between the speaker and the microphone comprising a part of the receiver and between the pickup coil and the inductive coil positioned within the receiver. Further, switches are provided for indicating that the buttons of the telephone have been released and also to indicate that the receiver 28 has been lifted from the device to permit the buttons to be released. Since the device fits directly over the telephone, substantial additional space is not required on the desk or table on which the telephone is positioned, and a pleasing appearance is provided.

From the foregoing description, it can be seen that the device of the present invention includes a case shaped to fit over and rest upon the cradle of a telephone set in form to define a cradle for supporting a telephone receiver. A supporting member, suitably of channel configuration, is mounted within the case. A first member is pivotally mounted at one end to the supporting member, with the first member suitably extending across the open end of the channel shaped supporting member. The other end of the first member is engageable with the buttons of a telephone set upon which the device is positioned. There is also provided a second member that is pivotally mounted at one end to the supporting member and positioned below the first member. The second member is suitably positioned within the channel defined by the supporting member. There is also provided first biasing means, suitably a spring, biasing the first member downward and second biasing means, also suitably a spring, biasing the second member upward. The second biasing means is advantageously of greater strength than the first biasing means. There is also provided means effective responsive to a signal applied thereto, suitably a solenoid, for pivoting the first member upward against the force of a first biasing means to a raised position to release the buttons and an element that is effective responsive to the receiver being positioned on the cradle defined by the case for pivoting the second member downward against the force of the second biasing means to a depressed position. The second member includes an element that is engageable with the first member for pivoting the first member upward and out of engagement with the buttons as the second member is pivoted upward upon the receiver being removed from the cradle. Thus, if the receiver is on the cradle, the second member will be in its depressed position, but the first member will be free to pivot for the purpose of releasing or depressing the buttons of the telephone in accordance with the state of the solenoid or other means effective responsive to the signal. However, if the receiver should be removed from the cradle, both the first and second members will be pivoted upward under the force of the second biasing means. There is also provided first and second switches associated with the first and second members respectively. As the first member is pivoted upward to release the buttons of the telephone, it will engage the pole of the first switch, closing the first switch to provide an indication that the buttons have been released. Similarly, when the second member is pivoted upward, it will engage the pole of the second switch to close contacts, indicating that the receiver has been removed from the cradle.

Although the invention has been described with respect to a particular preferred embodiment thereof, many changes and modifications will become apparent to those skilled in the art in view of the foregoing description which is intended to be illustrative and not limiting of the invention defined in the appended claims.

What I claim is:

1. A device of the character described comprising:

(a) a case shaped to fit over and rest upon the cradle of a telephone set and formed to define a cradle for supporting the telephone receiver associated with said set;

(b) a supporting member mounted within said case;

(c) a first member pivotally mounted at one end to said supporting member, the other end of said first member being normally engageable with the hookswitch buttons of the telephone set upon which said device is positioned;

(d) a second member pivotally mounted at one end to said supporting member;

(e) first biasing means biasing said first member downward to engage said buttons;

(f) second biasing means of greater strength than said first biasing means biasing said second member upward;

(g) solenoid means effective responsive to a signal applied thereto for pivoting said first member upward against the force of said first biasing means to a raised position to release the buttons; and (h) means effective responsive to the receiver being positioned on the cradle defined by said case for pivoting said second member downward against the force of said second biasing means to a depressed position;

(i) said second member including an element engageable with said first member for pivoting said first member upward against the force of said first biasing means and out of engagement with the buttons as said second biasing means causes said second member to pivot upward upon the receiver being removed from the cradle when a signal is not applied to the solenoid means.

2. A device as defined in claim 1 further including a first switch positioned within said case and having a pole engageable with said first member as said first member is pivoted upward to release the buttons and a second switch positioned within said case including a pole member engageable with said second member as said second member is pivoted upward responsive to the receiver being removed from said cradle, the operation of said first switch being effective to indicate release of the buttons and operation of said second switch being effective to indicate removal of said receiver.

3. A device as defined in claim 1 wherein said supporting member is of channel configuration opening upwardly, said first member extending across the open end of said channel and having downwardly extending portions enclosing said channel and engageable with said means effective responsive to a signal applied thereto.

4. A device as defined in claim 3 wherein said means effective responsive to a signal applied thereto comprises a solenoid positioned within said channel.

5. A device as defined in claim 3 wherein said second member is positioned between the walls of said channel and below said first member.

6. A device as defined in claim 1 wherein said means responsive to the receiver being positioned on the cradle comprises a vertically disposed member passing through an opening in the wall of the case with one end bearing against the second member at a point spaced apart from said one end, the other end of said vertically disposed member being adapted to bear against a receiver positioned on the cradle defined by said case.

7. A device as defined in claim 1 wherein said first and second biasing means are springs.

8. A device as defined in claim 6 wherein an opening is formed in the first member through which said vertically disposed member passes.

No references cited

KATHLEEN H. CLAFFY, Primary Examiner

R. P. TAYLOR, Assistant Examiner